Figure 6:
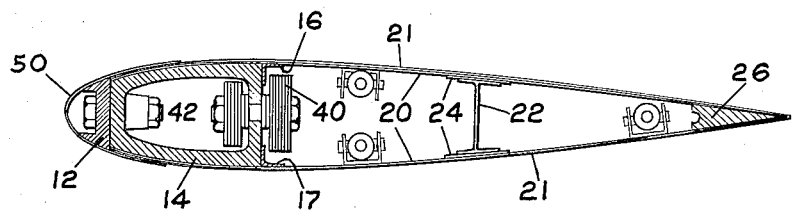

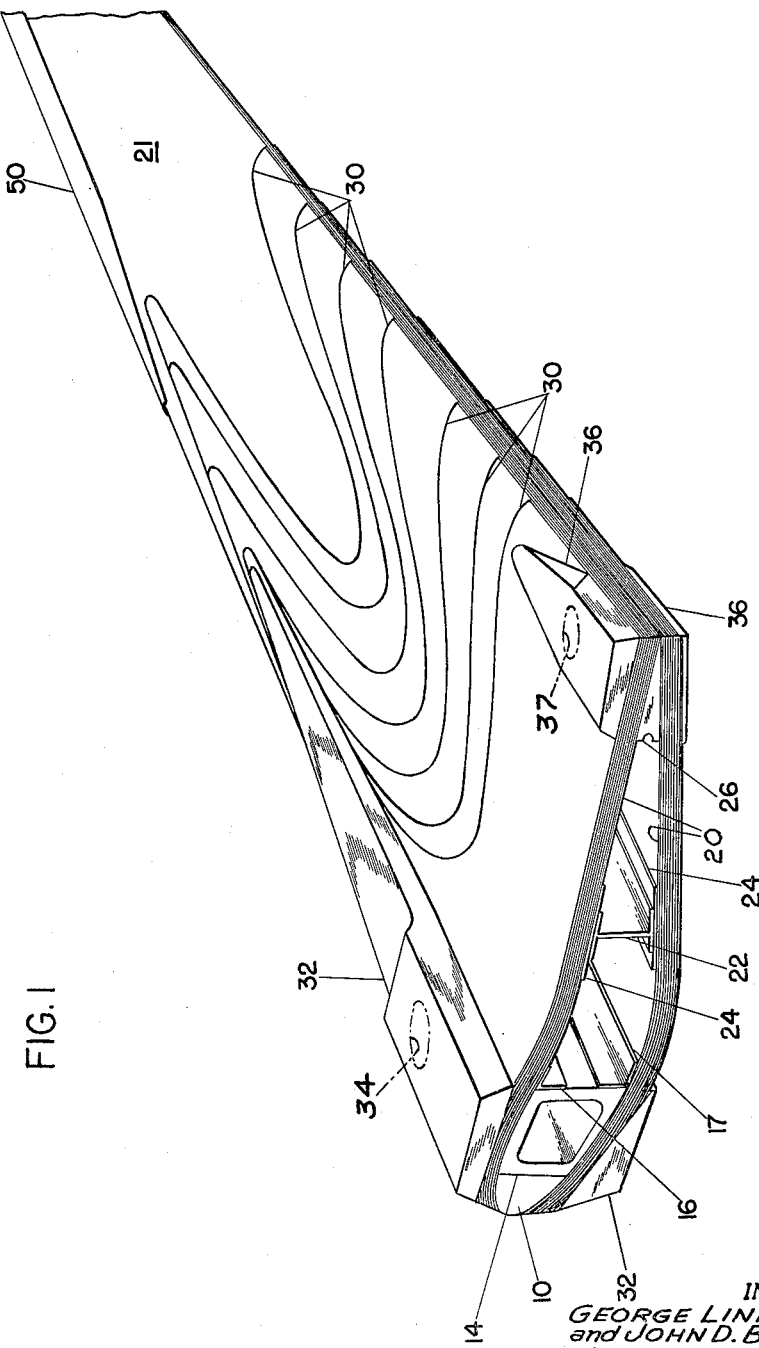

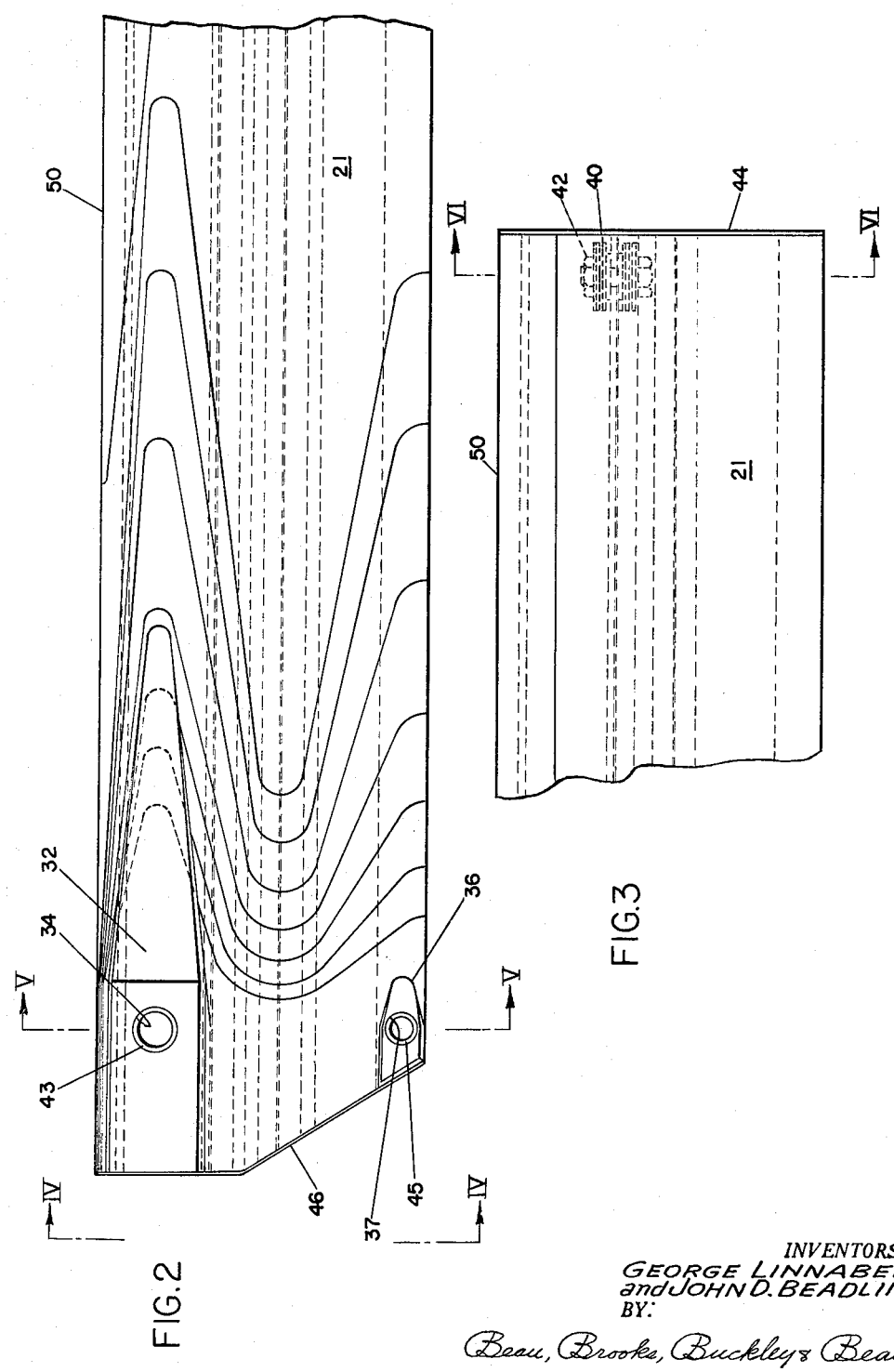

Oct. 17, 1961 G. H. LINNABERY ET AL 3,004,607
HELICOPTER METAL MAIN ROTOR BLADE
Filed May 15, 1956 6 Sheets-Sheet 3

INVENTORS:
GEORGE LINNABERY
and JOHN D. BEADLING
BY:
Beau, Brooks, Buckley & Beau,
ATTORNEYS.

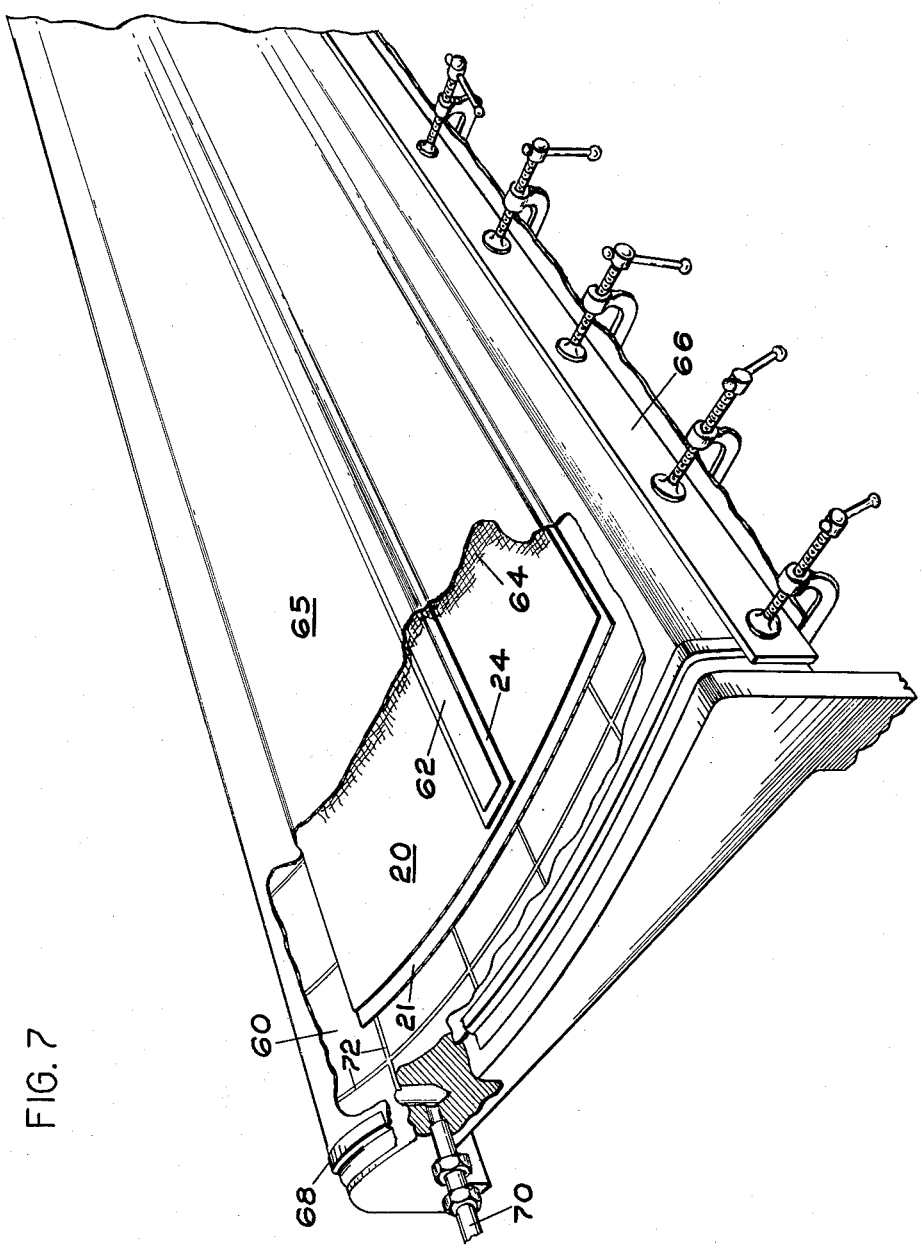

Oct. 17, 1961     G. H. LINNABERY ET AL     3,004,607
HELICOPTER METAL MAIN ROTOR BLADE

Filed May 15, 1956     6 Sheets-Sheet 5

INVENTORS:
GEORGE LINNABERY
and JOHN D. BEADLING
BY:

Beau, Brooks, Buckley & Beau,
ATTORNEYS.

Oct. 17, 1961  G. H. LINNABERY ET AL  3,004,607
HELICOPTER METAL MAIN ROTOR BLADE
Filed May 15, 1956                                    6 Sheets-Sheet 6

INVENTORS:
GEORGE LINNABERY
and JOHN D. BEADLING
BY:
Beau, Brooks, Buckley & Beau,
ATTORNEYS.

United States Patent Office 3,004,607
Patented Oct. 17, 1961

3,004,607
HELICOPTER METAL MAIN ROTOR BLADE
George H. Linnabery, Hurst, and John D. Beadling, Dallas, Tex., assignors, by mesne assignments, to Bell Aerospace Corporation, Wheatfield, N.Y., a corporation of Delaware
Filed May 15, 1956, Ser. No. 584,918
1 Claim. (Cl. 170—159)

This invention relates to hollow metal rotor blades, and more particularly to an improved lift rotor blade construction for use in rotary wing aircraft and the like.

A primary object of the invention is to provide improvements in metal rotor blade constructions, whereby the problems of vibration and flexing such as are invariably present are solved to a degree never before attained by previous designs.

Another object of the invention is to provide a rotor blade construction as aforesaid which features uniformly smooth airfoil contours at the outer surfaces of the blade, thereby eliminating operating "roughness" characteristics of certain prior blade designs.

Still another object of the invention is to provide an improved rotor blade as aforesaid which comprises a fewer number of parts in the fabrication assembly thereof.

Another object of the invention is to provide an improved blade as aforesaid which is adapted to be fabricated with improved facility by plural subassembly methods, whereby the final assembly is readily adapted to be accurately shaped and integrated while the subassembly components thereof are more easily handled incidental to the final assembly process.

Another object of the invention is to provide an improved blade as aforesaid wherein no internal stiffening beads or the like are required to maintain the "skin" components in prescribed shape.

Still another object of the invention is to provide an improved blade construction as aforesaid wherein the center of gravity of the blade in the chordwise direction thereof is readily arranged to be disposed at the preferred chordline position.

Another object of the invention is to provide a blade construction as aforesaid using straight or constant section standard type structural members, thus substantially reducing the cost of fabrication while at the same time retaining preferred structural qualities.

Another object of the invention is to provide an improved blade as aforesaid, which is constructed as to eliminate highly concentrated stress areas such as are usually found in previous designs.

Another object of the invention is to provide a blade as aforesaid which is of improved design; and impervious to fungi, rot and moisture absorption.

Another object of the invention is to provide a blade as aforesaid which embodies a multi-cell construction less susceptible to damage due to gun fire, or the like.

Other objects and advantages of the invention will appear from the specification hereinafter.

Figure 5:
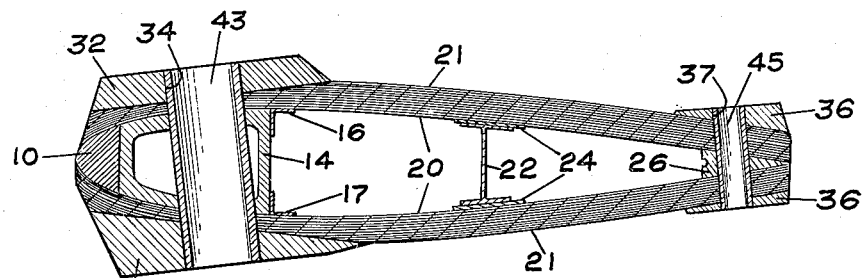
Figure 4:
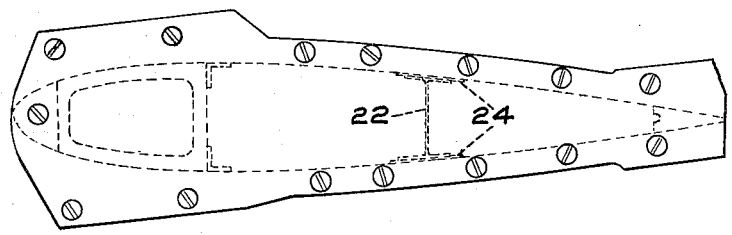
Figure 8:
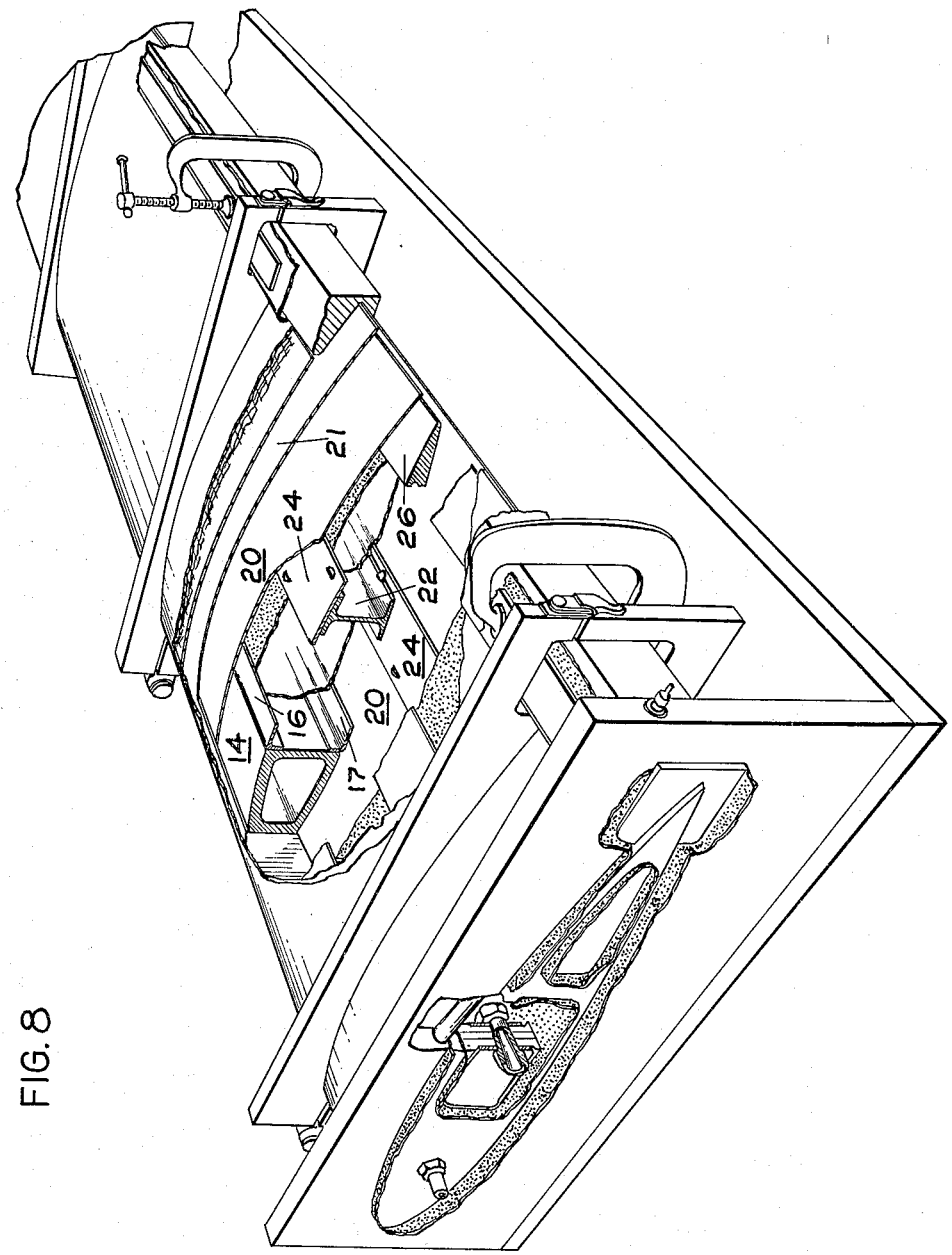
Figure 9:
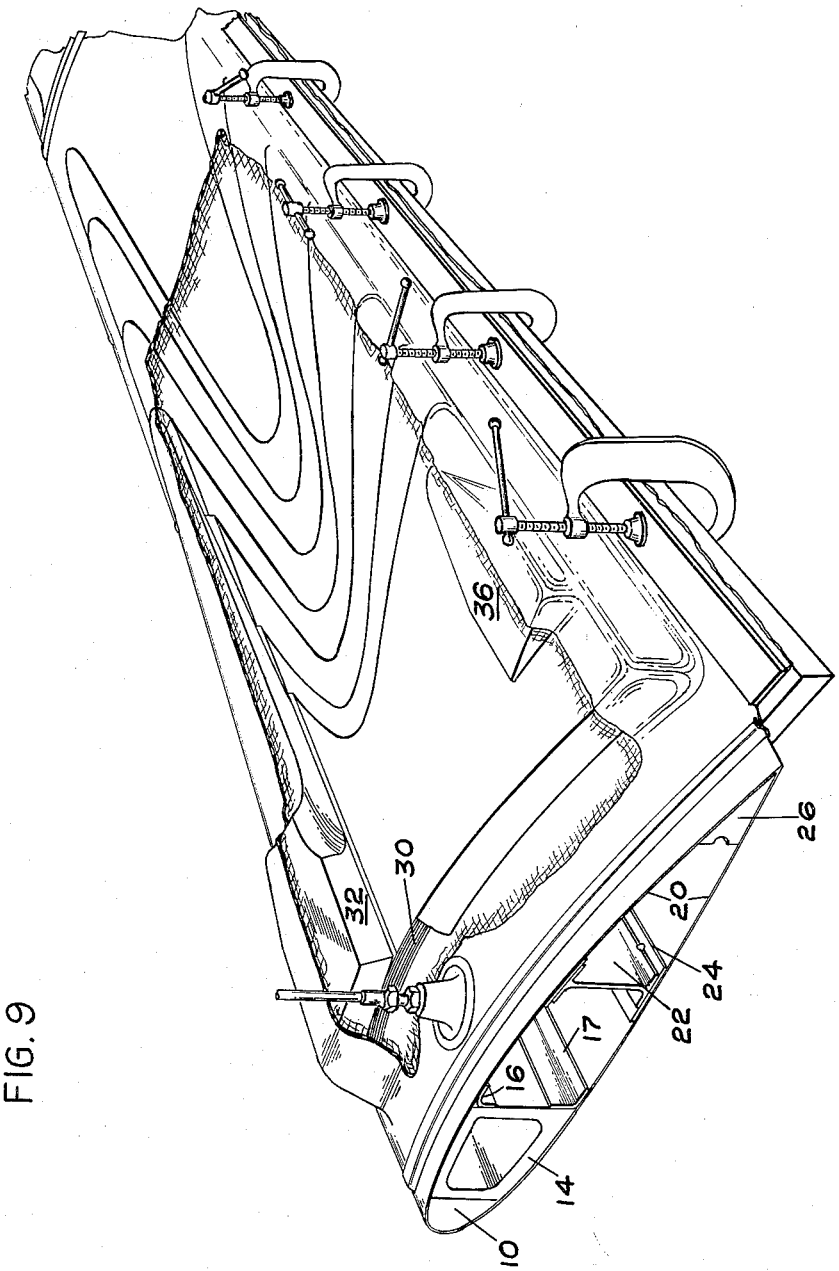

In the drawings:
FIG. 1 is a fragmentary perspective view showing the root end of a blade of the invention, prior to certain final machining operations thereon;
FIG. 2 is a fragmentary top plan view of the root end of the blade of FIG. 1;
FIG. 3 is a fragmentary top plan view of the tip end of the blade of FIGS. 1-2;
FIG. 4 is an end elevation of the root portion thereof, taken along line IV—IV of FIG. 2;
FIG. 5 is a section taken along line V—V of FIG. 2;
FIG. 6 is a section taken along VI—VI of FIG. 3;
FIG. 7 is a fragmentary perspective view showing one subassembly process incidental to fabrication of the blade of the invention;
FIG. 8 is a view similar to FIG. 7 illustrating an intermediate step of fabrication of the blade; and
FIG. 9 is still another view similar to FIGS. 7-8 but illustrating a final blade fabricating step.

As shown in the drawing, a blade of the invention is illustrated to include a metal nose member 10 of relatively light weight material such as aluminum alloy, extending spanwise of the blade from the root end to a point approximately 40 percent of the total span forming the aerodynamic leading edge shape. In continuation thereof in spanwise direction to the tip of the blade is provided a similarly shaped leading edge member 12 of substantially heavier metal, functioning as a blade balancing means in the chordwise direction thereof. Hence, the center of gravity of the blade is properly located in said chordwise direction, while at the same time the weight of the member 12 adds materially to the centrifugal forces acting on the blade in spanwise direction, thereby reducing the tendency to coning to an acceptable minimum. This construction possesses the further advantage of increasing the overall inertia of the blade, which is so important to the proper functioning of a lift sustaining rotor in a helicopter, especially in event of engine failure.

The main spar or "backbone" structure of the blade consists of a hollow box-shaped extruded aluminum alloy or other metal member 14 which is disposed immediately aft of the aforementioned nose members 10, 12 the forward wall or traverse web portion of member 14 being adhesive or weld-bonded to said nose members. The top and bottom surfaces of the spar 14 are shaped to conform to the upper and lower profiles of the desired airfoil section for the blade, and the spar extends as a single constant section from the blade root outwardly in spanwise direction to the tip thereof.

A pair of angularly shaped fillets 16, 17 are adhesively affixed to the transverse rear wall or web portion of the box member 14 and are located so that their top and bottom surfaces respectively are adhesively affixed to the inner surfaces 20 of the top and bottom skin assemblies 20—21 covering the blade. These angles 16, 17 operate to avoid concentrations of loads in the skin structures 20—21 that would otherwise result from the abrupt section change at the junction of the skin portions 20 and the box section 14. The skin structures each comprise a two piece sandwich of adhesively bonded sheets 20—21, as will be explained more fully hereinafter. An I beam as indicated at 22 is disposed between the upper and lower skin structures at a position approximately half way between the structure 14 and the trailing edge portion of the blade. The members 16, 17, and 22 extend from the root to the tip of the blade, and thus operate to reduce stress concentrations at the skin line. To further reduce such stresses a cover plate 24 is interposed between each top and bottom flange of the I beam 22 and the adjacent upper and lower skin sections. The trailing edge construction includes an extruded strip member 26 which separates the upper and lower skin members, while at the same time reinforcing the aft portion of the blade. The I beam 22 comprises a spar beam of oppositely facing, double channel sectional form defining with skin assemblies 20, 21, and with spar member 14 on the one hand and trailing strip member 26 on the other, box-sectional cell formations the aforesaid parts of which are cemented together at positions of abutting continuity, as will be described more in detail hereafter.

Thus, there is provided a blade having a multi-cell base structure comprising hollow main spar 14, defining one cell, and beam 22 which is spaced from spar 14 to define another cell therebetween, the beam 22 also being spaced from trailing edge member 26 to define a third cell. The two cells positioned between spar 14, beam 22 and member 26 are closed at the top and bottom thereof by the skin assemblies 20, 21.

As shown in FIGS. 1–2, the root end of the blade is reinforced by a multiplicity of metal sheet plates 30, each longer than the covering one, by virtue of which the spanwise bending loads are absorbed at the root end of the blade. At the same time the construction allows chordwise bending of the blade to take place over a greater distance measured from the blade tip inwardly toward the root, by virtue of the reduced areas of the plates 30 near their centers, while extending to a greater degree in spanwise direction at the forward and aft areas of the blade.

A mounting block 32 is fitted upon the blade for mounting in the blade grip (not shown); the block being bored at 34 to receive a bearing sleeve 43 which in turn receives the mounting bolt and is so shaped as to receive the loads from the skin laminae sheets in proper manner consistent with good structural design. A similar machined block 36 is affixed to the aft portion of the blade and is bored at 37 to receive a bearing sleeve 45 and a bolt attaching the drag brace (not shown) which in turn is attached to the hub of the aircraft rotor.

In order to attain proper spanwise balance, weights as illustrated at 40 (FIGS. 3, 6) are attached to the interior wall of the member 14 at the tip end of the blade by means of bolts 42 in such manner that they can be readily changed. Cover plates 44, 46 at the tip end and root end, respectively, completely seal the blade to prevent entrance of dirt and moisture to the interior thereof, such as would otherwise adversely affect the weight of the blade or cause corrosion detrimental to the structural qualities thereof. A leading edge cover 50 of highly abrasive-resistant material, such as stainless steel, is adhesively mounted to extend over that portion of the blade which is subjected to corrosion due to dust because of the relatively high speed of the outwardly disposed area.

It is a particular feature of the blade of the invention that it lends itself to fabrication by means of simplified and improved manufacturing techniques. The parts thereof are adhesively bonded together by means of any suitable rubber-base adhesive which cures at relatively low temperature, under pressure, in relatively short time. Hence, it is practicable to encase the subassemblies of the blade construction in heat-resistant rubber bags which are sealed air-tight and then placed in an autoclave under pressure throughout the adhesive curing process. During the assembly operation, and subsequent to the final assembly, the adhesive bond serves as a connection damper between the component parts, thus allowing positional readjustments thereof which permit optimum distribution of stresses throughout the assembly. Adhesives commercially available and found to be suitable for the purposes of assembling the blade of the invention include the phenolic-nitrile rubber compounds marketed by B. F. Goodrich Company under the trademark "Plastilock No. 601"; by the Narmco Company at Costa Mesa, California, under the trademark "Narmco No. 4021"; and by the Minnesota Mining & Manufacturing Company under the trademark "AF–6."

A particularly feasible method of assembly of the blade construction of the invention involves initially a subassembly of the nose pieces 10, 12 in relation to the box spar 14, by simply holding the parts in proper alignment subsequent to application of adhesive therebetween, and then enclosing the subassembly in a heat-resistant bag under pressure and heat until the adhesive is cured. As a separate subassembly, paired skin sheets 20—21 are set in position (FIG. 7) while in standard stock flat sheet form against a contour block 60 which may be formed of plastic or any other suitable moldable material. The cover plate 24 (FIGS. 4, 5, 6) is then placed in position against the skin sheet 20 with adhesive disposed between the skin sheets 20—21 and the cover plate 24. A protection strip 62 may also be disposed against the cover plate 24 to facilitate the pressure application, and a wicking layer of fibre glass or the like as indicated at 64 may be disposed over the subassembly and inside of the flexible cover bag which is indicated at 65.

The bag 65 is pressure-sealed by means of clamp bars as indicated at 66, and by means of end straps 68; and the interior of the assembly is vented to the outside atmosphere or connected to a vacuum source as indicated at 70. Channels 72 are provided in the face of the contour block 60 to permit uniform bleeding of pressure from interiorly of the assembly. Thus, when the assembly is disposed within a pressure autoclave or the like and subjected to heat and pressure for an appropriate time, the adhesive disposed between the skin sheets 20—21 and the plate 24 will be thereby cured so as to lock the subassembly together. Incidental to the application of the pressure referred to hereinabove, the skin sheets 20—21 will be forced to assume the curved contour of the block 60, which is preseletced so as to conform to the desired aerodynamic contour of the skin sheets when assembled in the finished blade of the invention.

Thus, by means of one simple subassembly operation, the skin sheets 20—21 are simultaneously curved to the required airfoil contour thereof and are then set in cooperating adhesively locked positions in pre-stressed condition. This feature of the construction imparts to the skin subassemblies improved rigidity and resistance against undesirable deflections incidental to the subsequent assembly and under operative conditions. The angle fillets 16—17 are then spot-bonded to the skin subassembly by simply placing them in appropriate positions on the skin assembly and pressing a hot soldering iron or the like thereagainst at suitable intervals; the adhesive material previously referred to having been first applied between the contacting surfaces of the skin assembly and the fillet members.

The next step of the assembly process involves mounting the nose block and box beam subassembly and I beam 22 and the trailing edge strip 26 within a jig as illustrated in FIG. 8; the upper and lower skin subassemblies being simultaneously placed in position to overlie and span the box beam and I beam and trailing edge components. The entire assembly is supported within a bonding bag, while two internal rubber bags of expandable rubber tubing are disposed within the blade cavities defined between the box section and the I beam and between the I beam and the trailing edge piece 26. The internal rubber bags are vented to the autoclave pressure; and thus when the assembly is placed within the autoclave and subjected to pressure for the required time the parts will be firmly bonded together.

It will be appreciated that the component parts of the assembly will be thereby bonded firmly together in properly aligned relationship without possibility of distortion of parts such as would otherwise occur due to the existence of relatively high bonding pressures and stress concentrations. The stainless steel erosion shield 50 is subsequently mounted to the leading edge of the assembly by means of any suitable local bag device, and the laminated grip devices are readily bonded upon the blade construction by means of a pressure bag method as illustrated in FIG. 9 of the drawing herewith. The variously contoured plates are simply placed in proper location on the blade with adhesive applied between the plates, and the assembly is then bagged and placed in an autoclave under heat and pressure for the required time as explained hereinabove.

Subsequent to curing of the blade in the finally assembled form as illustrated and described hereinabove, the root end portion is machined, from the shape thereof illustrated in FIG. 9, for example, into the final finished form thereof illustrated in FIGS. 1 and 2, so as to shape the root end of the blade to properly mate with the surface of the hub forging to which the blade is to be applied. Thus, the connection pin holes and connections may be precisely located subsequent to removal of the excess blade lengths, to insure production of blades to uniform specifications.

It will of course be appreciated that the blade of the invention may be constructed of any suitable materials. For example, the skin portions thereof may be formed of aluminum alloy or stainless steel, or titanium alloy stock sheets; and similarly, the other parts of the blade construction may be formed of any desired or preferred materials. It is a particular feature and advantage of the blade of the invention that the center of pressure thereof in chordwise direction may be readily provided to substantially coincide with the chordwise position of the center of gravity thereof, as well as to be in alignment with the elastic axis of the blade. This feature is of particular importance for example in connection with a semirigid rotor blade arrangement wherein relatively high chordwise loadings are experienced.

In accord with the construction of the present invention, the full chord width is employed to embody structural components capable of resisting the chordwise loadings experienced by the blade during operation. Thus, the blade of the invention involves not only improved simplicity of construction but also improved freedom from surface deviations from the prescribed airfoil contours thereof: coincidence of the blade elastic axis and the chordwise location of center of pressure and center of gravity; and avoidance of stress concentrations throughout the entire blade assembly. It will of course be also appreciated that whereas only one form of the invention has been illustrated and described in detail, various changes may be made therein without departing from the spirit of the invention or the scope of the following claim.

We claim:

A hollow rotor blade comprising a multi-cell structure shaped externally to airfoil contour form, said structure comprising a series of spanwise extending stiffening elements disposed in spaced relation to each other throughout their lengths and joined together solely by external skin means so as to provide a blade of multi-cellular structural form adapted to withstand flexing of the blade in the chordwise direction with the center of pressure, center of gravity and the elastic axis of said blade substantially coinciding, said stiffening members consisting of a leading edge member in the form of a generally rectangularly sectioned hollow metal extrusion having upper and lower surface portions forming the shapes for corresponding portions of the blade and rearwardly terminating in a transverse web portion, an intermediate member in the form of an I-sectioned metal member, and a trailing edge member, said skin means including upper and lower metal sheet members adhesively bonded to said leading edge, intermediate and trailing edge members to join the same together, a pair of angle members having one leg of each adhesively bonded to said upper and lower skin sheets and their other legs adhesively bonded to said web portion of the leading edge member, the legs of said angle members which are joined to the skin sheets being substantially more flexible than said leading edge member to avoid stress concentrations in the skin means at its juncture with said web portion of the leading edge member due to flexure of the blade, a pair of cover plates interposed between the top and bottom flanges of said intermediate member and said cover plates being of a width to extend beyond said flanges at either side thereof to avoid stress concentrations in the skin means at its junctures with said flanges due to flexure of the blade, said skin-engaging legs of said angle members and the corresponding edges of said cover plates being spaced apart.

References Cited in the file of this patent

UNITED STATES PATENTS

| | | |
|---|---|---|
| 2,214,339 | McKee | Sept. 10, 1940 |
| 2,303,707 | Pullin | Dec. 1, 1942 |
| 2,482,936 | Renoux | Sept. 27, 1949 |
| 2,512,264 | Brauchler | June 20, 1950 |
| 2,556,736 | Palmatier | June 12, 1951 |
| 2,694,458 | Stevens | Nov. 16, 1954 |
| 2,751,667 | Gruetjin | June 26, 1956 |
| 2,754,915 | Echeverria | June 17, 1956 |

FOREIGN PATENTS

| | | |
|---|---|---|
| 635,823 | Great Britain | Apr. 19, 1950 |
| 644,900 | Great Britain | Oct. 18, 1950 |